United States Patent
Casey et al.

(10) Patent No.: US 7,206,681 B2
(45) Date of Patent: Apr. 17, 2007

(54) ADAPTIVE VIBRATION MANAGEMENT SYSTEM FOR A WORK MACHINE

(75) Inventors: Kent Allen Casey, Washington, IL (US); Norval Paul Thomson, Dunlap, IL (US); Vernon Richard Smith, Mossville, IL (US)

(73) Assignee: Caterpillar Inc., Peoria, IL (US)

( * ) Notice: Subject to any disclaimer, the term of this patent is extended or adjusted under 35 U.S.C. 154(b) by 284 days.

(21) Appl. No.: 11/016,199

(22) Filed: Dec. 20, 2004

(65) Prior Publication Data
US 2006/0136110 A1  Jun. 22, 2006

(51) Int. Cl.
*G06F 19/00* (2006.01)
(52) U.S. Cl. .................... 701/50; 701/56; 360/31; 360/60; 360/75; 276/136; 188/378; 198/750.8; 198/751; 198/770
(58) Field of Classification Search .............. 701/50, 701/56; 360/31, 60, 75; 276/136; 188/378; 198/750.8, 751, 770
See application file for complete search history.

(56) References Cited

U.S. PATENT DOCUMENTS

| | | | |
|---|---|---|---|
| 3,609,684 A | 9/1971 | Lipp | |
| 3,849,760 A | 11/1974 | Endou et al. | |
| 3,928,719 A | 12/1975 | Sasabe et al. | |
| 3,967,241 A | 6/1976 | Kawa | |
| 3,993,976 A | 11/1976 | Ginsburg | |
| 5,392,898 A * | 2/1995 | Burgess et al. | 198/750.8 |
| 5,901,246 A | 5/1999 | Hoffberg et al. | |
| 5,903,454 A | 5/1999 | Hoffberg et al. | |
| 6,000,703 A | 12/1999 | Schubert et al. | |
| 6,400,996 B1 | 6/2002 | Hoffberg et al. | |
| 6,418,424 B1 | 7/2002 | Hoffberg et al. | |
| 6,644,590 B2 | 11/2003 | Terpay et al. | |
| 6,804,579 B1 * | 10/2004 | Laski | 700/245 |

(Continued)

FOREIGN PATENT DOCUMENTS

DE    103 53 692    6/2004

OTHER PUBLICATIONS

Wegerich, Similarity based modeling of time synchronous averaged vibration signals for machinery health monitoring, IEEE, vol. 6, Mar. 6-13, 2004 pp. 3654-3662 vol. 6.*

*Primary Examiner*—Thomas Black
*Assistant Examiner*—McDieunel Marc
(74) *Attorney, Agent, or Firm*—Finnegan, Henderson, Farabow, Garrett & Dunner

(57) ABSTRACT

A vibration management system for a work machine may include at least one machine component configured to respond to input commands from an operator of the machine. One or more vibration sensors may be configured to output a signal indicative of a vibration level experienced by the operator. A controller may be configured to monitor the output signal from the one or more vibration sensors and determine an average vibration level experienced by the operator. The controller may also be configured to monitor the input commands from the operator and calculate a predicted response of the at least one machine component to at least one of the input commands. The controller may also be configured to determine a predicted vibration effect on the operator based on the predicted response and adjust an actual response of the at least one machine component to the at least one operator input command based on the predicted vibration effect and the average vibration level.

32 Claims, 4 Drawing Sheets

U.S. PATENT DOCUMENTS

2001/0044685 A1    11/2001  Schubert
2002/0128072 A1     9/2002  Terpay et al.
2005/0038579 A1*    2/2005  Lewis .......................... 701/29
2005/0051198 A1*    3/2005  Laski .......................... 134/34

* cited by examiner

ADAPTIVE VIBRATION MANAGEMENT SYSTEM FOR A WORK MACHINE

TECHNICAL FIELD

The present disclosure relates to vibration control and, more particularly, to systems and methods for managing vibrations experienced by an operator of a work machine.

BACKGROUND

Work machine operators can experience significant levels of vibration. Many regulatory bodies have imposed restrictions on the vibration levels that an operator may be exposed to over time. To comply with these restrictions, an operator's time on a particular machine can be limited. Specifically, the operator may be required to cease operation of the machine once he has experienced a certain vibration level for a predetermined period of time. Alternatively, an active vibration management system may be employed in an attempt to reduce the average vibration level experienced by the operator and, therefore, prolong his allowed time on the machine.

Various systems have been proposed for actively reducing vibrations in a machine. Many of these systems involve sensing of vibrations produced in the machine and reducing the vibrations transferred from a vibration source to the frame of the machine. For example, U.S. Pat. No. 6,644,590 to Terpay et al. ("the '590 patent"), which issued on Nov. 11, 2003, describes an active system and method for reducing vibrations generated by a gearbox in a rotary wing aircraft. In this system, an active mount is connected between the gearbox and the airframe using hydraulic actuators to suspend the airframe from the gearbox. Based on output signals from various vibration sensors, hydraulic fluid may be supplied to the actuators to move the gearbox relative to the airframe. This motion may be controlled to minimize the transfer of vibrations from the gearbox to the frame.

While the system of the '590 patent may help reduce the vibrations transferred to certain machine components, the system has several shortcomings. For example, the system of the '590 patent cannot monitor or track average vibration levels experienced by an operator or component. Further, the system includes no predictive capability for determining the vibration response of a system to various operator inputs. In addition, the system does not include the capability of adjusting the response of a machine component to reduce the amount of vibration produced. Therefore, the system of the '590 patent may be unsuitable as a means for ensuring that an operator of a work machine does not experience a certain vibration level for greater than a permissible length of time.

The present disclosure is directed to overcoming one or more of the problems associated with the prior art active vibration reduction systems.

SUMMARY OF THE INVENTION

One aspect of the disclosure includes a vibration management system. The vibration management system may include at least one machine component configured to respond to input commands from an operator of the machine. One or more vibration sensors may be configured to output a signal indicative of a vibration level experienced by the operator. A controller may be configured to monitor the output signal from the one or more vibration sensors and determine an average vibration level experienced by the operator. The controller may also be configured to monitor the input commands from the operator and calculate a predicted response of the at least one machine component to at least one of the input commands. The controller may also be configured to determine a predicted vibration effect on the operator based on the predicted response. The controller may also be configured to adjust an actual response of the at least one machine component to the at least one operator input command based on the predicted vibration effect and the average vibration level.

Another aspect of the present disclosure includes a method of controlling vibrations on a work machine. The method may include determining an average vibration level to which an operator of the work machine has been exposed. The method may also include monitoring input commands from an operator and determining a vibration effect as a result of a predicted response of at least one machine component to at least one of the input commands. The method may include adjusting an actual response of the at least one machine component based on the determined vibration effect and the average vibration level.

Another aspect of the present disclosure includes a work machine. The work machine may include a frame and a power source operably connected to the frame. One or more traction devices may be operably connected to the frame. The work machine may also include at least one machine component configured to respond to input commands from an operator of the machine. The work machine may further include one or more vibration sensors configured to output a signal indicative of a vibration level experienced by the operator. The work machine may include a controller that is configured to monitor the output signal from one or more vibration sensors and determine an average vibration level experienced by the operator. The controller may be configured to monitor the input commands from the operator and calculate a predicted response of the at least one machine component to at least one of the input commands. The controller may be configured to determine a predicted vibration effect on the operator based on the predicted response and adjust an actual response of the at least one machine component to the at least one operator input command based on the predicted vibration effect level and the average vibration level.

Another aspect of the present disclosure includes an active vibration management system for a work machine. The active vibration management system may include at least one machine component configured to respond to input commands from an operator of the machine. The system may include one or more vibration sensors that may be configured to output a signal indicative of a vibration level experienced by the operator. The system may also include at least one vibration reduction unit. The system may include a controller configured to monitor the output signal from the one or more vibration sensors and determine an average vibration level experienced by the operator. The controller may be configured to monitor the input commands from the operator and calculate a predicted response of the at least one machine component to at least one of the input commands. The controller may be configured to determine a predicted vibration effect on the operator based on the predicted response. The controller may be configured to operate the at least one vibration reduction unit in a manner to at least partially counteract the predicted vibration effect on the operator when the predicted vibration effect would cause the average vibration level to exceed a predetermined vibration threshold value.

DETAILED DESCRIPTION

Figure 1:
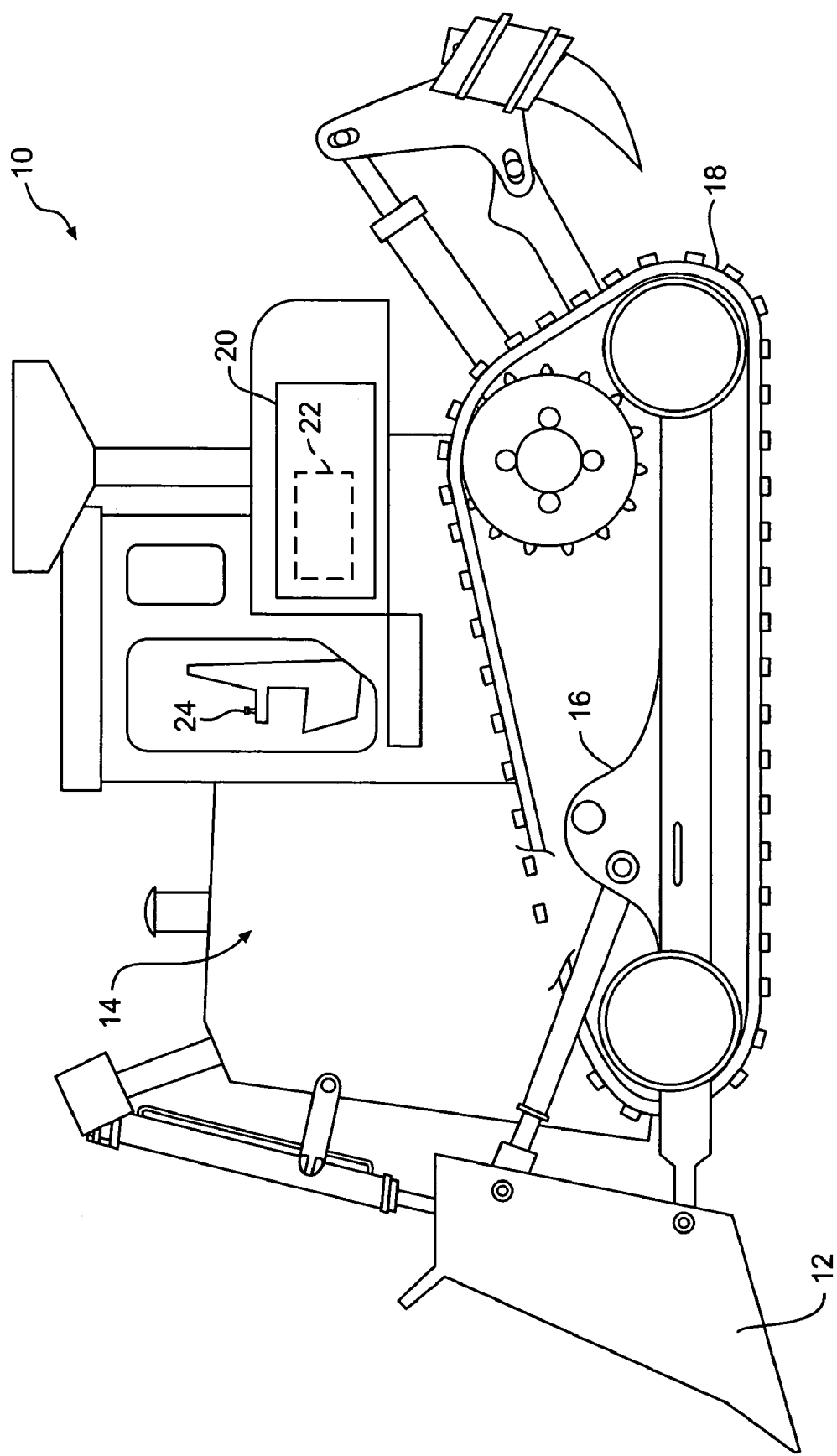
FIG. 1 is a pictorial representation of a work machine according to an exemplary disclosed embodiment.

FIG. 1 provides a pictorial illustration of work machine 10. While work machine 10 is shown as a track type tractor, work machine 10 may include various other types of machines. For example, work machine 10 may be a wheeled tractor, shovel/excavator, dump truck, garbage collection truck or any other device that includes one or more machine components 12 configured to respond to input commands from an operator.

Work machine 10 may include a power source 14, a frame 16, and one or more traction devices 18. Power source 14 and traction device 18 may be operatively connected to the frame. Work machine 10 may also include a vibration management system 20 including controller 22. Work machine 10 may include an input device 24 that receives input commands from an operator.

While illustrated in FIG. 1 as a work implement (a blade for a track type tractor in this illustration), machine component 12 may constitute any component on or operatively connected to work machine 10 that may be configured to respond to an operator's input commands through input device 24. For example, machine component 12 may include one or more electrically controlled components, power train components, electronically controlled components, hydraulically controlled components, suspension components, and any other such device known in the art.

Input device 24, as illustrated in FIG. 1 may be a steering wheel, a joystick, or any other device that may serve as an interface between the operator and machine component 12. Machine component 12 may respond directly or indirectly to a command given by the operator to input device 24. For example, machine component 12 may raise, lower, tilt etc. in direct response to movements of input device 24 (e.g., a joystick). Alternatively, machine component 12 may respond indirectly to input device 24. For example, in a situation where machine component 12 includes a suspension component or other similar device, machine component 12 may respond indirectly to input device 24 by reacting to motions caused by operation of input device 24.

Figure 2:
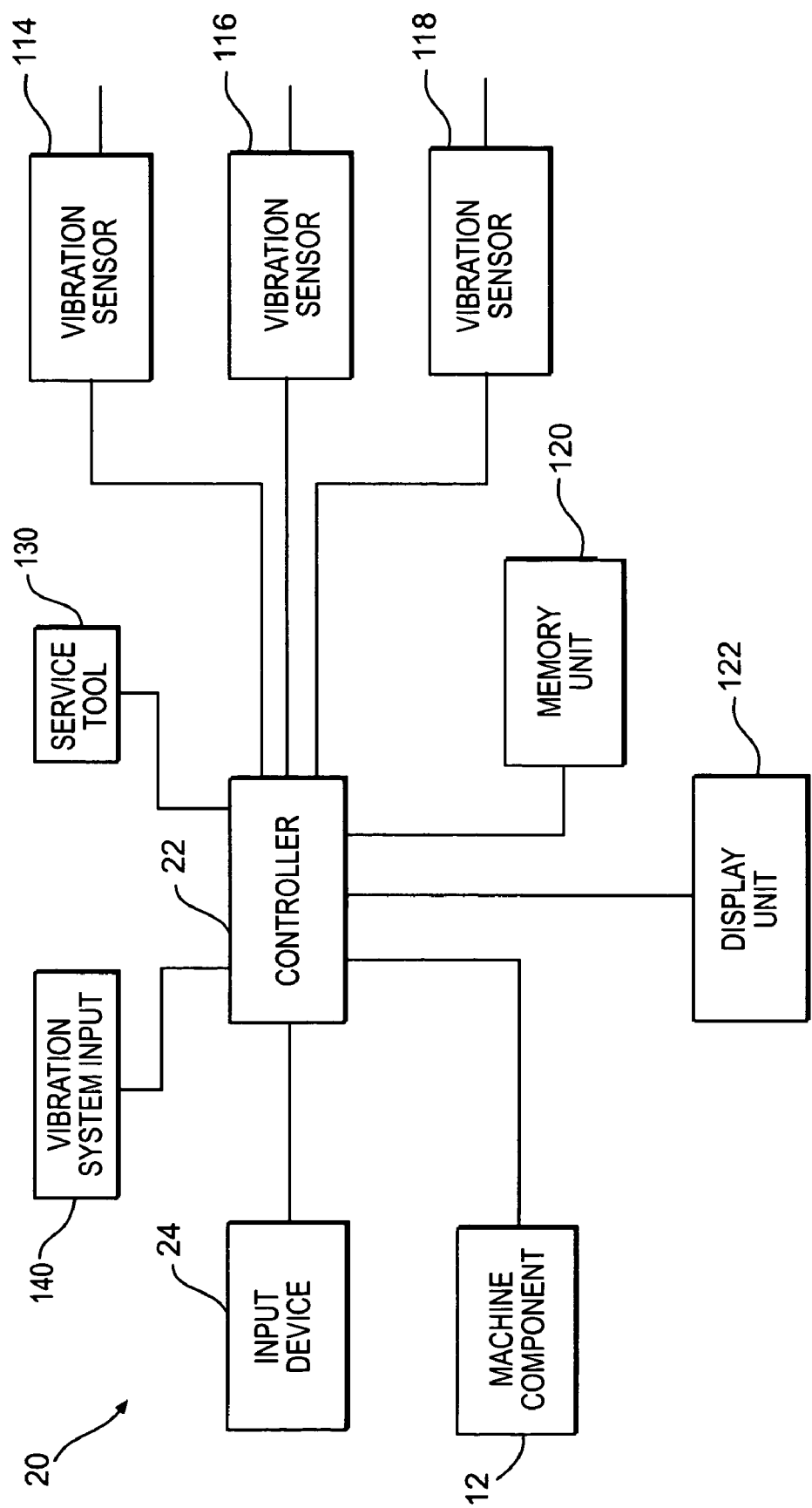
FIG. 2 is a block diagram representation of a vibration management system according to an exemplary disclosed embodiment.

FIG. 2 provides a block diagram representation of a vibration management system 20 according to an exemplary disclosed embodiment. Vibration management system 20 may include controller 22, at least one machine component 12, one or more vibration sensors 114, 116 and 118, input device 24, and a memory unit 120. Vibration management system 20 may also include a display unit 122, a service tool 130 and a vibration system input 140.

As illustrated in FIG. 2, vibration management system 20 may include one or more vibration sensors. While the exemplary system shown in FIG. 2 includes three sensors: sensor 114, sensor 116 and sensor 118; vibration management system 20 may include any number of vibration sensors. The number of vibration sensors used in vibration management system 20 may range from one to any desired number for meeting the objectives of a particular application. Each vibration sensor may be placed in any desired location on work machine 10. Each vibration sensor may be configured to sense the vibrations experienced by the operator on an independent axis of motion. For example, sensors 114, 116 and 118 may be configured to sense vibrations in pitch, roll and yaw directions, respectively. Each sensor may provide an output signal to controller 22 indicative of a sensed vibration level. Hydraulic, electromechanical, piezoelectric, or any other sensors known in the art may be used in vibration management system 20.

Controller 22 may include any devices suitable for running a software application. For example, controller 22 may include a CPU, RAM, I/O modules etc. In one embodiment, controller 22 may constitute a unit dedicated for adjusting the response of the machine components of work machine 10. Alternatively, however, controller 22 may be integrated with and/or correspond to an electronic control unit (ECU) of work machine 10.

Controller 22 may be configured to monitor the output signal from at least one of vibration sensors 114, 116 and 118. The data from these signals may be stored in memory unit 120. Based on the vibration information provided by sensors 114, 116 and 118, controller 22 may determine an average vibration level experienced by the operator of work machine 10. The average vibration level may be determined by sampling vibration level outputs from at least one of vibration sensors 114, 116, and 118 and storing the outputs in memory unit 120. There is continuous updating of data and the average value may be determined by including the new data and calculating an average over some or all of the sample times.

Controller 22 may be configured to determine the average vibration level during various stages of operation of work machine 10. For example, the calculation may begin when an operator begins using work machine 10. Controller 22 may continuously or intermittently calculate the average value during a period of time in which the operator remains on the work machine 10. Optionally, a time delay may be imposed such that the calculation of the average vibration level from any of sensors 114, 116, and 118 may begin only after waiting for a predetermined period of time. Controller 22 may reset the average vibration level calculation for one or more sensors 114, 116 and 118 when a new operator begins operating work machine 10.

Alternatively or additionally, controller 22 may be configured to determine a rate of change of the average vibration level. This rate of change may be determined by storing a series of calculated average vibration level values and determining the slope of a curve through these values. The slope determination can be made for the current time of for any time in the past during which vibration management system 20 was operational.

Controller 22 may also be configured to monitor the vibration levels on more than one axis. For example, as shown in FIG. 2, controller 22 may monitor the vibrations from three sensors—114, 116 and 118, wherein each sensor senses vibrations on different independent axes. Controller 22 may therefore be configured to calculate the average vibration level for each of a plurality of predetermined axes of motion.

Controller 22 may also be configured to monitor the input commands given to input device 24. For example, when an operator moves input device 24 (e.g., a joystick) to lift machine component 12 (e.g., blade), controller 22 can monitor the motion of input device 24. Controller 22 may calculate a predicted response (or movement) of machine component 12 resulting from the motion of input device 24. This predicted response may be calculated with the help of data stored in memory unit 120, for example, that correlates the response of machine component 12 to a given input command from the operator. Once the operator moves input device 24, controller 22 may determine the magnitude and direction of that motion and may predict the response of machine component 12. The predicted response may be in the form of motion velocity and direction data for one or more portions of machine component 12. Controller 22 may also be configured to predict a response of elements other than machine component 12. For example, based on operator commands to any appropriate input device, controller 22 may predict a response of such components such as power source 14, various drive train/power train components (not shown). While the following description describes the operation of vibration management system 20 with respect to only machine component 12, it should be noted that the same or similar operations may be performed with any appropriate components/systems (e.g. power train/drive train components, etc.) on work machine 10.

Controller 22 may be further configured to determine a predicted vibration effect on the operator based on the predicted response of machine component 12. The predicted vibration effect may be determined, for example, based on predetermined physical attribute information for machine component 12. For example, certain physical attribute information of machine component 12, such as mass, moments of inertia, motion limits, motion profiles (e.g., whether hard/soft stops exist, etc.), and vibration/motion profiles etc. may be stored in memory unit 120. Using the predicted response of machine component 12 and its physical attributes, controller 22 may now calculate the various forces generated by machine component 12 when it moves in response to the operator's input to input device 24. Based on the calculated forces, controller 22 may predict a resulting vibration profile experienced by the operator as a result of the impending motion of machine component 12. This calculated vibration profile may be summed with any other known sources of vibration (e.g., as determined by accessing predetermined motion/vibration profiles for machine component 12) to provide a total predicted vibration effect on the operator of machine component 12.

Based on this predicted vibration effect, controller 22 may be configured to adjust the actual response of the machine component 12 if the predicted vibration effect would cause the average vibration level (e.g., for one or more axes of motion) to exceed a predetermined threshold value. Controller 22 may also be configured to adjust the actual response of machine component 12 based on the calculated rate of change of the average vibration level. For example, if the current rate of change would result in the threshold value being exceeded during the operator's scheduled operating time, then the actual response of machine component 12 may be adjusted. Additionally, a combination of the average vibration level and the rate of change of the average vibration level may be used when determining whether to adjust the actual response of a component. For example, in situations where the actual response may cause the average vibration level to momentarily exceed the threshold value, an adjustment to the actual response may be avoided or lessened if the rate of change of the average vibration level is trending downwards or has remained constant for a predetermined length of time. The actual response of the machine component 12 includes any or all motions and/or operations of machine component 12 in direct or indirect response to an operator's input to input device 24. The actual response of machine component 12 may be adjusted to reduce the resulting vibration effects on the operator.

In one embodiment, controller 22 may adjust the actual response of machine component 12 by varying actuation control signals provided to machine component 12. Rather than issuing or allowing the normal control signals in response to a movement of input device 24, controller 22 may alter at least a portion of the control signals to reduce the vibration effects of machine component 12 on the operator. For example, rather than allowing a full acceleration level of machine component 12 requested by the operator, controller 22 may condition the control signals to accelerate or decelerate machine component 12 at a slower rate to reduce the effects of these motions on the operator. Other adjustments to the actual response may be applied depending on the needs of a particular application. Adjusting the actual response of machine component 12 in this manner may help to maintain the average vibration level experienced by the operator on any or all axes of motion below a predetermined threshold value.

In addition to adjusting control signals to systems or components that respond directly to an operator input to input device 24 (e.g., a blade or other work implement), controller 22 may also be configured to provide certain control signals to system that indirectly respond to the operator's inputs. For example, in certain situations, the vibration effects of the motion or operation of machine component 12 may be mitigated by providing control signals to one or more other systems. In certain embodiments, these other systems may include suspension systems. Actuating these systems or components of these systems can have the effect of at least partially offsetting the vibration producing motions of machine component 12.

In addition, controller 22 may be configured to adjust the actual response of machine component 12 based on at least one of a predetermined operator vibration threshold level and a predetermined operator time usage limit. The controller may be configured to record the time a particular operator starts using the work machine 10. As the operator approaches a predetermined time usage limit, the controller may adjust the response of machine component 12 such that the average vibration level experienced by the operator does not exceed the operator vibration threshold level for the predetermined time usage limit.

Controller 22 may also be configured to compile machine usage statistics for the operator and further base the adjustment to the actual response of the machine component 12 on the compiled machine usage statistics for the operator. This may be achieved by storing an operator's usage history in memory unit 120, for example. This data may include information relating to the operator's use of work machine 10. In certain embodiments, the data may include the amount of time spent by the operator on work machine 10 for one or more operation sessions prior to the current use, the average vibration levels experienced by the operator during prior operation sessions, the machine components used by the operator during prior use, and any other appropriate information.

When in a later session, the operator inputs a command to input device 24, controller 22 may analyze the operator's past usage history and adjust the response of machine component 12 based at least partially on this history. For example, when an operator inputs a command to input device 24, controller 22 may determine that the predicted vibration effect may cause his average vibration level to exceed a predetermined threshold value. However, before controller 22 adjusts the actual response of machine component 12, it may analyze the operator's past usage history. If controller 22 determines from the operator's past usage history that the operator normally uses work machine 10 in a manner that does not cause him to exceed the vibration threshold value, then controller 22 may choose to allow the actual response to occur with little or no adjustment. On the other hand, if the operator's past usage history shows that he frequently causes high vibration levels (especially within a short period of time), then controller 22 may adjust the actual response of machine component 12 more aggressively.

Additionally, the operation of vibration management system 20 may be optional. Specifically, the vibration management system 20 may operate in an enabled mode in which controller 22 is allowed to adjust the actual responses of various machine components. Vibration management system may also be disabled such that controller 22 is prevented from making adjustments to the actual responses of the various components.

Operational modes may be important, for example, if work machine 10 is operated in a semi-autonomous mode. In a semi-autonomous mode of operation, an operator may not be present on the machine. Instead, the machine may be controlled remotely by an operator at a base station. Thus, without an operator present, there may be less need to operate vibration management system 20. Nevertheless, vibration management system 20 may be enabled, for example, when work machine 10 includes a vibration sensitive component or when work machine 10 receives a vibration sensitive payload.

An owner of work machine 10 may set the values of one or more parameters associated with vibration management system 20 using, for example, service tool 130. Service tool 130 may be a portable device configured to interface with work machine 10 (e.g., a laptop). For example, the owner may select and input a predetermined vibration threshold limit and/or a predetermined time threshold limit. The predetermined vibration threshold limit may correspond to the maximum vibration threshold level that an operator may be exposed to over a certain period of time. This limit may be prescribed by regulatory bodies or may be determined by the operator. Alternatively, the owner of work-machine may also use vibration system input 140 to set the vibration threshold limit and/or time threshold limit. In such an embodiment, an authorization code may be required to set these values using input 140, which is normally available to the operator as well. The use of an authorization code would minimize the possibility of the operator overriding the information provided by the owner of work machine 10. Upon beginning a session on the machine, the operator may use vibration system input 140 to set a predetermined time limit that lies within the threshold set by the owner of work machine 10.

Display unit 122 may be configured to display to the operator information related to the operation of vibration management system 20. For example, display unit 122 may be configured to display an average vibration level determined based on one, some, or all of the vibration sensors on work machine 10. Also, display unit 122 may show an actual response adjustment status indicator to convey to the operator when an actual adjustment has occurred along with the degree of the adjustment. Display unit 122 may include a CRT unit, a flat panel display unit, one or more indicator lights, or any other display devices known in the art.

Alternatively or in addition, display unit 122 may also be remotely located with respect to work machine 10. For example, when work machine 10 is used in a semi-autonomous mode, display unit 122 may be located at a site management station. Work machine 10 may include any suitable technology for enabling communications between controller 22 and display unit 122 located at the site management station.

Figure 3:
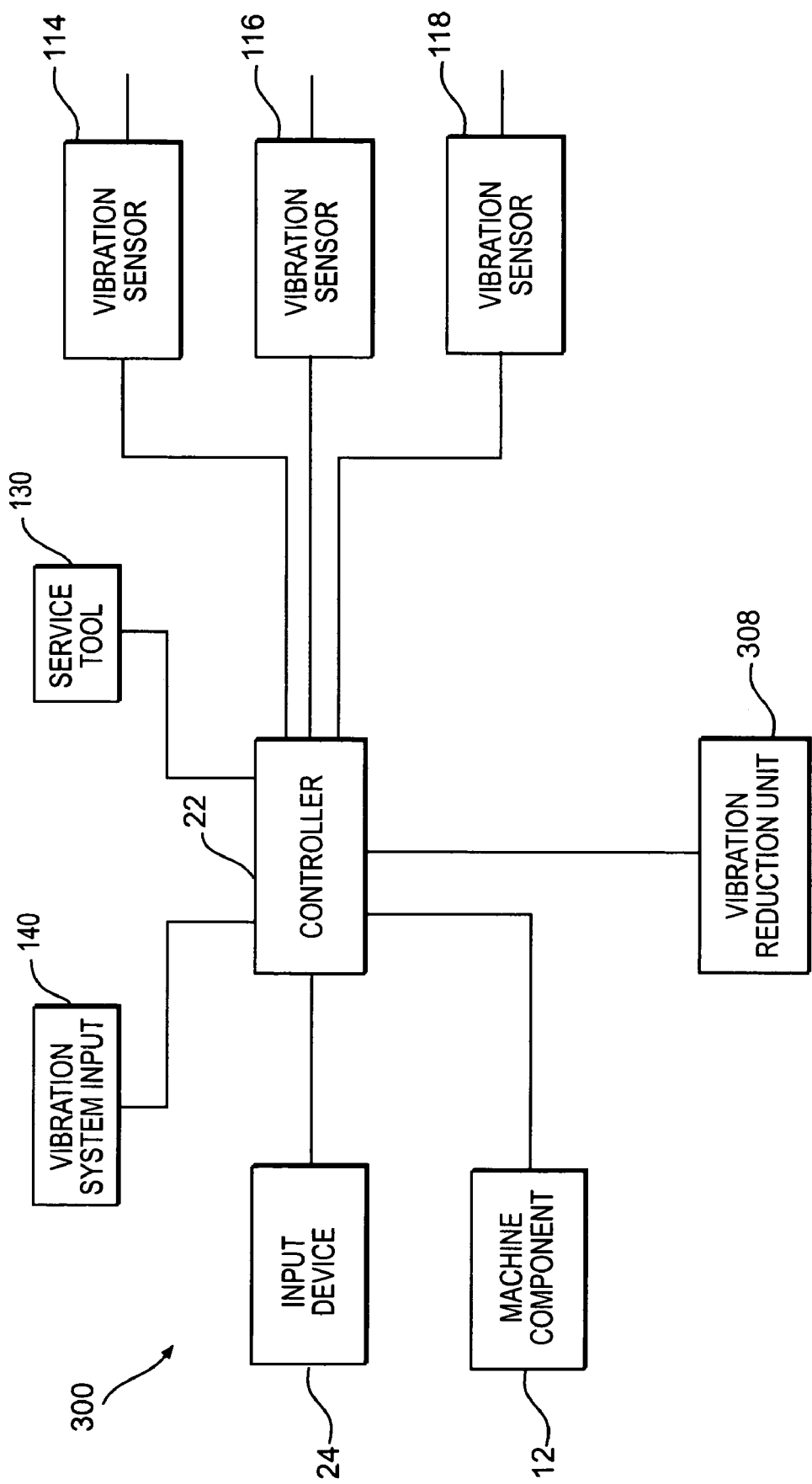
FIG. 3 is a block diagram representation of a vibration management system according to another exemplary disclosed embodiment.

FIG. 3 provides a block diagram illustrating another exemplary vibration management system 300 consistent with the present disclosure. Vibration management system 300 may include all of the same components as vibration management system 20, as shown in FIG. 2. Additionally, vibration management 300 may include a vibration reduction unit 308.

Vibration reduction unit 308, as shown in FIG. 3, may include any device that may be operated actively to reduce vibrations. For example, vibration reduction unit 308 may include one or more of an active suspension component of work machine 10, a stabilized operator platform, a stabilized operator seat, or any other actively controlled device. Vibration reduction unit 308 may be equipped with components that can respond to a controller signal. For example, vibration reduction unit 308 may include one or more motors that may cancel or reduce vibrations experienced by an operator of work machine 10 in response to signals from controller 22. When controller 22 determines that the predicted vibration effect will cause the average vibration level experienced by the operator of work machine 10 to exceed a predetermined vibration threshold, controller 22 may send actuation control signals to vibration reduction unit 308. Vibration reduction unit 308 may respond to these signals by moving or actuating one or more components to at least partially counteract the predicted vibration effect on the operator.

The disclosed active vibration management system 300 may be used alone or in conjunction with one or more other vibration management systems (e.g., vibration management system 20). Active vibration management system 300 may serve to counteract the predicted vibration effect of machine component 12 in response to an operator's command to input device 24 on work machine 10. If used in conjunction with another vibration management system, vibration management system 300 may be configured to compensate for residual vibration remaining after the action of the other vibration management system.

INDUSTRIAL APPLICABILITY

Figure 4:
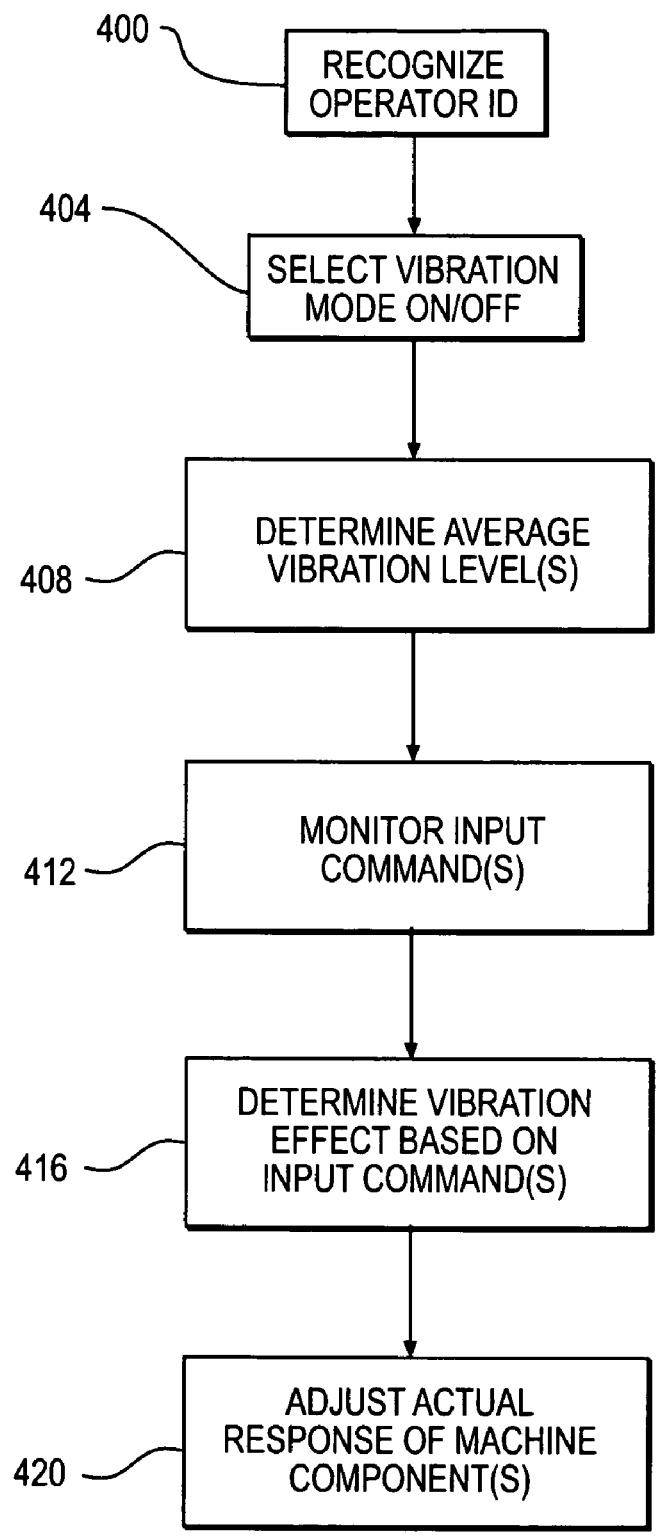
FIG. 4 is a flow chart illustrating the steps of an exemplary disclosed vibration management method.

FIG. 4 provides a flow chart illustrating the steps of an exemplary disclosed vibration management method. At step 400, controller 22 may determine the identity of the operator operating the machine. The operator's identity may be determined by the key code entered by the operator upon entering work machine 10. Alternatively, controller 22 may use the operator's RFID tag, or other appropriate means to determine his identity. At step 404, the work mode of work machine 10 may be set. Vibration management system may be enabled (vibration mode on) or disabled (vibration mode off). If enabled, then at step 408, controller 22 may determine the average vibration level to which an operator of the work machine 10 has been exposed. At step 412, controller 22 may monitor input commands from the operator to input device 24. At step 416, controller 22 may determine a vibration effect as a result of a predicted response of at least one machine component 12 to at least one of the input commands. At step 420, controller 22 may adjust an actual response of the at least one machine component 12 based on the determined vibration effect and the average vibration level.

The disclosed adaptive vibration management system 20 may be used on any system where an operator is exposed to vibrations. By calculating the average vibration level experienced by an operator and using this information to proactively reduce the vibration effect experienced by the operator, vibration management system 20 may prolong the period of time an operator may remain on work machine 10. In addition, by adjusting the response of machine component 12 on the basis of each individual operator's usage history, vibration management system 20 may tailor the operation of work machine 10 for each operator.

The disclosed adaptive vibration management system 20 has many potential benefits. The vibration management system 20 may proactively adjust the response of machine component 12 so that an operator's exposure to vibration may be controlled. By proactively adjusting the response of machine component 12, vibration management system 20 can maximize an operator's time on work machine 10. In addition, the system may obviate the need for the owner of work machine 10 to periodically check the vibration level experienced by an operator of work machine 10. Furthermore, the owner of work machine 10 may periodically vary the vibration and time thresholds on work machine 10 to conform with any changes in regulations. This may be done without any mechanical or structural changes to work machine 10.

It will be apparent to those skilled in the art that various modifications and variations can be made in the disclosed vibration management system without departing from the scope of the disclosure. Additionally, other embodiments of the disclosed system will be apparent to those skilled in the art from consideration of the specification. It is intended that the specification and the examples be considered exemplary only, with a true scope of the disclosure being indicated by the following claims and their equivalents.

What is claimed is:

1. A vibration management system for a work machine, comprising:
    at least one machine component configured to respond to input commands from an operator of the work machine;
    one or more vibration sensors configured to output a signal indicative of a vibration level experienced by the operator; and
    a controller configured to:
        monitor the output signal from one or more vibration sensors and determine an average vibration level experienced by the operator;
        monitor the input commands from the operator and calculate a predicted response of the at least one machine component to at least one of the input commands;
        determine a predicted vibration effect on the operator based on the predicted response; and
        adjust an actual response of the at least one machine component to the at least one operator input command based on the predicted vibration effect and the average vibration level.

2. The vibration management system of claim 1, wherein the controller is further configured to adjust the actual response of the at least one machine component based on a rate of change of the average vibration level.

3. The vibration management system of claim 1, wherein the controller is configured to adjust the actual response of the at least one machine component if the predicted vibration effect will cause the average vibration level to exceed a predetermined vibration threshold value.

4. The vibration management system of claim 1, wherein the one or more vibration sensors include three vibration sensors each being associated with an independent axis of motion.

5. The vibration management system of claim 4, wherein the controller is configured to monitor the output signal from each of the three vibration sensors and determine an average vibration level experienced by the operator with respect to each of the independent axes of motion.

6. The vibration management system of claim 5, wherein the controller is configured to adjust the actual response of the at least one machine component if the average vibration level for any of the independent axes of motion would exceed a predetermined vibration threshold value.

7. The vibration management system of claim 1, wherein the controller is further configured to adjust the actual response of the at least one machine component based on at least one of a predetermined operator vibration threshold level and a predetermined operator time usage limit.

8. The vibration management system of claim 1, wherein the controller is configured to compile machine usage statistics for the operator and to further base the adjustment to the actual response of the at least one machine component on the compiled machine usage statistics for the operator.

9. The vibration management system of claim 1, wherein the at least one machine component includes one or more electrically controlled components, power train components, electronically controlled components, and hydraulically controlled components.

10. The vibration management system of claim 1, further including a display unit configured to display to the operator at least one of the average vibration level and an actual response adjustment status indicator.

11. A method of controlling vibrations on a work machine, comprising:
    determining an average vibration level to which an operator of the work machine has been exposed;
    monitoring input commands from the operator;
    determining a vibration effect as a result of a predicted response of at least one machine component to at least one of the input commands; and
    adjusting an actual response of the at least one machine component based on the determined vibration effect and the average vibration level.

12. The method of claim 11, wherein the adjusting of an actual response is further based on a rate of change of the average vibration level.

13. The method of claim 11, wherein determining the average vibration level includes determining an average vibration level for each of three independent motion axes.

14. The method of claim 11, wherein adjusting the actual response of the at least one machine component is further based on at least one of a predetermined operator vibration threshold level and a predetermined operator time limit on the machine.

15. The method of claim 11, wherein adjusting the actual response of the at least one machine component includes controlling the at least one machine component to limit a vibration output of the at least one machine component when the determined vibration effect would cause the average vibration level to exceed a predetermined vibration threshold value.

16. The method of claim 11, wherein adjusting the actual response of the at least one machine component includes controlling at least one of an electrically controlled component, power train component, electronically controlled component, hydraulically controlled component and a suspension component to at least partially counteract the vibration effect.

17. The method of claim 11, further including compiling machine usage statistics for the operator and basing the adjusting of the actual response of the at least one machine component on the machine usage statistics for the operator.

18. The method of claim 11, further including displaying, on a display unit, information relating to vibrations of the work machine.

19. A work machine, comprising:
a frame;
a power source operably connected to the frame;
one or more traction devices operably connected to the frame;
at least one machine component configured to respond to input commands from an operator of the machine;
one or more vibration sensors configured to output a signal indicative of a vibration level experienced by the operator; and
a controller configured to:
monitor the output signal from one or more vibration sensors and determine an average vibration level experienced by the operator;
monitor the input commands from the operator and calculate a predicted response of the at least one machine component to at least one of the input commands;
determine a predicted vibration effect on the operator based on the predicted response; and
adjust an actual response of the at least one machine component to the at least one operator input command based on the predicted vibration effect and the average vibration level.

20. The work machine of claim 19, wherein the controller is further configured to adjust the actual response of the at least one machine component based on a rate of change of the average vibration level.

21. The work machine of claim 19, wherein the controller is configured to adjust the actual response of the at least one machine component if the predicted vibration effect will cause the average vibration level to exceed a predetermined vibration threshold value.

22. The work machine of claim 19, wherein the one or more vibration sensors include three vibration sensors each being associated with an independent axis of motion.

23. The work machine of claim 22, wherein the controller is configured to monitor the output signal from each of the three vibration sensors and determine an average vibration level experienced by the operator with respect to each of the independent axes of motion.

24. The work machine of claim 22, wherein the controller is configured to adjust the actual response of the at least one machine component if the average vibration level for any of the independent axes of motion would exceed a predetermined vibration threshold value.

25. The work machine of claim 19, wherein the controller is further configured to adjust the actual response of the at least one machine component based on at least one of a predetermined operator vibration threshold level and a predetermined operator time usage limit.

26. The work machine of claim 19, wherein the controller is configured to compile machine usage statistics for the operator and to further base the adjustment to the actual response of the at least one machine component on the compiled machine usage statistics for the operator.

27. The work machine of claim 19, wherein the at least one machine component includes one or more electrically controlled components, power train components, electronically controlled components, and hydraulically controlled components.

28. The work machine of claim 19, further including a display unit configured to display to the operator at least one of the average vibration level and an actual response adjustment status indicator.

29. A vibration management system for a work machine, comprising:
at least one machine component configured to respond to input commands from an operator of the machine;
one or more vibration sensors configured to output a signal indicative of a vibration level experienced by the operator;
at least one vibration reduction unit; and
a controller configured to:
monitor the output signal from the one or more vibration sensors and determine an average vibration level experienced by the operator;
monitor the input commands from the operator and calculate a predicted response of the at least one machine component to at least one of the input commands;
determine a predicted vibration effect on the operator based on the predicted response; and
operate the at least one vibration reduction unit in a manner to at least partially counteract the predicted vibration effect on the operator when the predicted vibration effect would cause the average vibration level to exceed a predetermined vibration threshold value.

30. The vibration management system of claim 29, wherein the at least one vibration reduction unit includes an element selected from a group including an active suspension component for the work machine, a stabilized operator platform, and a stabilized operator seat.

31. The vibration management system of claim 29, wherein the one or more vibration sensors include three vibration sensors each being associated with an independent axis of motion.

32. The vibration management system of claim 29, wherein the at least one machine component includes one or more hydraulically controlled components.

* * * * *